United States Patent [19]
Green et al.

[11] Patent Number: 5,405,440
[45] Date of Patent: Apr. 11, 1995

[54] PROCESS FOR THE PREPARATION OF A COLD MIX ASPHALT PAVING COMPOSITION

[75] Inventors: Harold C. Green, Sykesville; Daniel J. Shaw, Riva, both of Md.

[73] Assignee: Global Resource Recyclers, Inc., Forestville, Md.

[21] Appl. No.: 121,590

[22] Filed: Sep. 16, 1993

[51] Int. Cl.⁶ ............................................. C08L 95/00
[52] U.S. Cl. ........................... 106/281.1; 106/277; 106/276; 404/17; 404/72; 404/81
[58] Field of Search .................. 106/273.1, 277, 281.1, 106/282, 284.01, 276; 404/17, 81, 72, 79

[56] References Cited

U.S. PATENT DOCUMENTS

| | | | |
|---|---|---|---|
| 2,701,213 | 2/1955 | Neville | 106/278 |
| 4,145,322 | 3/1979 | Maldonado et al. | 428/489 |
| 4,279,660 | 7/1981 | Kamo et al. | 106/284.01 |
| 4,359,381 | 11/1982 | Jinno | 106/277 |
| 4,373,961 | 2/1983 | Stone | 106/281.1 |
| 4,946,307 | 8/1990 | Jakob | 404/91 |
| 4,974,993 | 12/1990 | Crabbi | 404/79 |
| 5,000,615 | 3/1991 | Murray | 404/81 |
| 5,223,032 | 6/1993 | Gaudio et al. | 106/281.1 |
| 5,236,497 | 8/1993 | Grzybowski | 106/282 |
| 5,242,493 | 9/1993 | Glynn, Jr. et al. | 106/281.1 |

Primary Examiner—Karl Group
Assistant Examiner—Michael Marcheschi

[57] ABSTRACT

A method of producing a cold mix asphalt paving composition by:
(a) separating non-asphalt impurities from an asphalt rubble obtained from a reclaimed asphalt pavement to produce a purified asphalt rubble;
(b) comminuting said purified asphalt rubble to obtain sized asphalt-aggregate mixture;
(c) testing said sized asphalt-aggregate mixture to determine the percent of asphalt present in said asphalt-aggregate mixture; and
(d) blending an asphalt emulsion with said asphalt-aggregate mixture in an amount so as to yield a cold mix asphalt pavement composition comprising from about 4.0% to about 6.5% by weight of asphalt.

The cold mix asphalt paving composition is used to coat roadway surfaces, parking lots, driveways, and the like. Once the cold mix asphalt paving composition has been applied to a surface, a top coat may be overcoated onto the cold mix asphalt pavement.

12 Claims, 1 Drawing Sheet

PROCESS FOR THE PREPARATION OF A COLD MIX ASPHALT PAVING COMPOSITION

BACKGROUND OF THE INVENTION

Field of the Invention

This invention pertains to asphalt paving compositions for use in road building and the like. More particularly, this invention pertains to processes for making cold mix asphalt paving compositions containing reclaimed asphaltic pavement.

Background of the Related Art

Asphalt may be treated for use in paving compositions by using one of two conventional methods. These methods are appropriately called the "hot mix" and "cold mix" methods.

In the hot mix process, the asphalt is liquified at approximately 300° F. to 350° F. by heating. The viscosity of the asphalt decreases as the temperature increases and it becomes a liquid at a temperature sufficiently below its flash point. The melted asphalt is then mixed with aggregate. The aggregate must also be hot when it is combined with the liquid asphalt so it does not cool the asphalt and cause it to solidify. Therefore, hot mix plants incorporate a rotary kiln to dry the aggregate and heat it to a few hundred degrees Fahrenheit. The hot aggregate is then mixed with the liquid asphalt. The asphalt/aggregate mixture is stored until it can be transported.

In conventional cold mix processes, the liquid asphalt is in the form of an asphalt emulsion. The asphalt emulsion is then blended with a sized aggregate to form a cold mixture useful for asphalt pavement. The aggregate then cements into a hard pavement that is essentially identical to the hot mix bituminous asphalt.

U.S. Pat. No. 2,701,213, to Neville, teaches a process for producing an asphalt paving composition. The process comprises removing the used asphaltic material from the road surface, reducing the material in size, adding additional asphalt conditioner to the material, and curing the resulting mix. This process necessarily utilizes an asphalt conditioner having at least forty percent by weight of aromatic hydrocarbons.

U.S. Pat. No. 4,946,307 describes an apparatus for the cold, in-place recycling of asphalt paving of an asphalt roadway. The apparatus includes a cylindrical milling drum which serves to remove a thickness of the asphalt paving and break the same into particles as the apparatus moves forwardly along the roadway. The particles are lifted to a separating drum which separates the particles according to size. The relatively small particles are mixed with a suitable liquid additive and then discharged onto the roadway. A following paver then forms the discharged material into new paving. The oversized particles are discharged onto the roadway at a location in front of the milling drum.

In all of the prior art, asphalt pavement recycling processes, existing asphalt pavement is ground and immediately passed into a reconditioning process.

None of the prior art processes are applicable to the recycling of asphalt rubble that contains impurities such as dirt. Often when asphalt pavement is removed from the ground there is a large amount of dirt accompanying the broken, excavated asphalt rubble. Presently all such asphalt rubble is disposed by dumping it into a landfill. Due to the preciousness of available landfill space it is highly desirable, if not governmentally mandated, to recycle as much asphalt pavement as possible.

It is also highly desirable to recondition asphalt with a conditioner having less than 20% of aromatic hydrocarbons to conform with air quality standards.

It is also desirable to provide a centralized asphalt reclamation site to which excavated asphalt rubble can be transported and dumped for recycling.

It is therefore an object of the present invention to provide a process to separate impurities from asphalt rubble and to process the separated asphalt rubble into a cold mix asphalt pavement.

It is a further object of the present invention to provide a cold mix asphalt pavement having a low amount of aromatic hydrocarbons in the added asphalt binder.

SUMMARY OF THE INVENTION

The present invention is a process for producing an asphalt paving composition wherein a component of the paving composition is reclaimed asphalt pavement. The method includes the following steps:

(a) removing the asphalt pavement that is to be reclaimed from an existing surface or roadway to form a stockpile of asphalt rubble having asphalt and non-asphalt impurities;

(b) separating non-asphalt impurities from the asphalt rubble to recover a recyclable, purified asphalt;

(c) contacting the separated, purified asphalt with an impact crusher to produce a sized asphalt RAP (reclaimed asphalt pavement);

(d) testing the sized asphalt RAP to determine the amount of asphalt present in the asphalt RAP;

(e) adding an asphalt emulsion to the asphalt RAP in an amount so as to yield a modified asphalt RAP containing from about 4.0% to about 6.5% asphalt with the remaining portion consisting of aggregate and filler; and (f) mixing the asphalt emulsion and the asphalt RAP to prepare a cold mix asphalt paving composition.

The asphalt rubble that may be reclaimed in this invention includes all the asphalt pavement present between the top layer and the dirt subgrade of a roadway. The asphalt paving composition may contain any amount of reclaimed asphalt pavement. Preferably the product cold mix asphalt paving composition of the present invention contains at least about 50% reclaimed asphalt pavement, preferably at least 65%, most preferably at least 80% reclaimed asphalt pavement.

Based upon the amount of residual asphalt present in the reclaimed sized asphalt RAP, asphalt emulsion is combined with the reclaimed asphalt pavement. The resulting mixture will contain about 4.0% by weight to about 6.5% asphalt, preferably about 5.25% to about 5.75% asphalt.

The asphalt paving composition produced by this invention may be used to coat roadway surfaces, parking lots, driveways, and the like. Once the cold mix asphalt paving composition of the present invention has been applied to a surface it may be sealed with a top coat of conventional hot mix asphalt.

DESCRIPTION OF THE PREFERRED EMBODIMENTS

Figure 1:
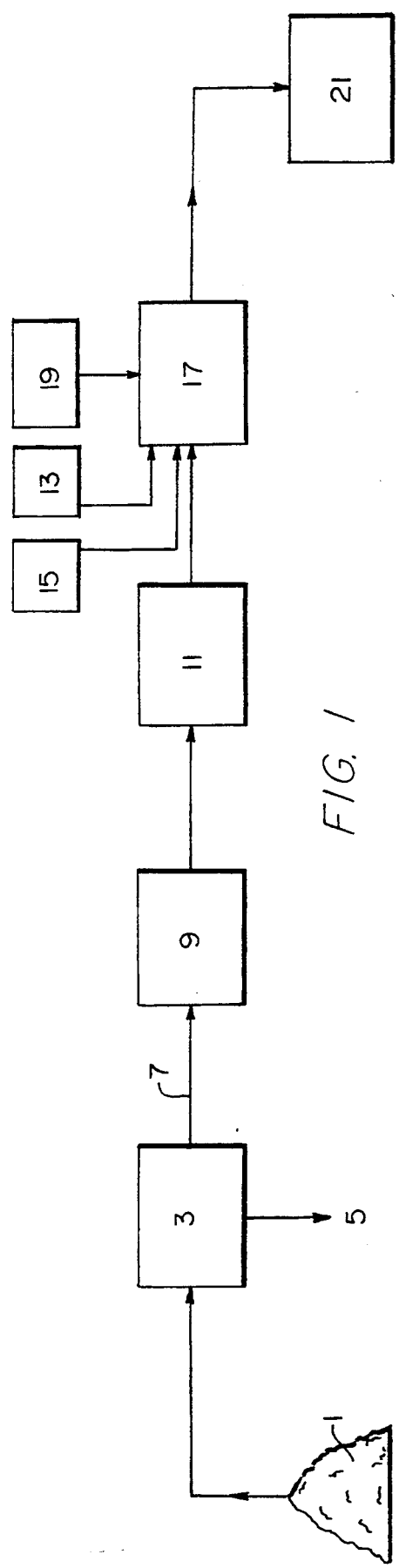
FIG. 1 is a schematic representation of the process of the present invention.

Asphalt rubble is recovered from airport runways, driveways, highways, streets or parking lots by excavating, milling or scraping these existing pavements. The asphalt rubble contains dirt, asphalt (bitumen) and aggregates.

After asphalt is removed as rubble from the existing pavement, the asphalt rubble is transported to the location of the reclamation plant. The rubble asphalt can be stockpiled for subsequent use or immediately processed.

The first step of the present reclamation process is a separation step in which the asphalt rubble is treated to remove dirt. The dirt must be substantially removed so that there is no dirt present in the final cold mix asphalt paving composition. The presence of dirt in an asphalt paving composition leads to inadequate bonding between the asphalt and the aggregate in the dirt affected areas thereby promoting the rapid deterioration of the subsequent paving composition. There are a number of methods of accomplishing the separation of dirt from the asphalt rubble. These methods include the use of vibrating screens, washing of the asphalt rubble on conveyors including high pressure washers, grinding and separating by screening, high pressure vacuuming, and dumping the asphalt rubble in a wash float. The preferred separation process for the removal of impurities from the asphalt rubble is by the use of a vibrating screen. A typical vibrating screen contains 1.5 inch square holes in the form of a punch plate. The asphalt rubble is conveyed onto the screen and the rubble that does not pass through the vibrating screen is sent to an impact crusher. The undersized material including impurities that fall through the screen is discarded. The oversized asphalt rubble may be passed over the vibrating screen again in an attempt to remove further impurities that were missed in the first pass. The vibrating screen preferably removes non-asphaltic impurities such as dirt having a particle size of less than 1 to 1½ inch in diameter from the asphalt rubble thereby yielding a purified asphalt rubble that is substantially pure of foreign contaminants. Contaminants that are removed by the vibrating screen predominantly include dirt.

In the next step of the present process the cleaned or purified asphalt rubble is conveyed to a comminuting machine such as an impact crusher for sizing. The impact crusher typically operates at an approximate speed of 450 revolutions per minute. The impact crusher comminutes or crushes the purified asphalt rubble to size the rubble into a sized asphalt-aggregate mixture hereinafter referred to as sized RAP (reclaimed asphalt pavement). The speed of the impact crusher may be varied to obtain the desired sized aggregate having a reasonably uniform gradation from fine to course as defined by sieve analysis. According to this invention at least ninety-five percent (95%) of the reclaimed asphaltic pavement must pass through a 1.5 inch sieve after passing through the comminuting machine.

Table 1 summarizes the average sieve analysis of the sized RAP after passing through the comminuting step: Preferred sized RAP analysis is shown in parentheses.

TABLE 1

| Sieve Size | Average RAP Material Percent Passing by Weight |
|---|---|
| 2 inch | 100.0 |
| 1.5 inch | 95.0–100.0 (100) |
| 1 inch | 80.0–95 (90) |
| ½ inch | 60–85 (75) |
| ⅜ inch | 50–75 (65) |
| No. 4 | 30–65 (40) |
| No. 8 | 10–40 (25) |
| No. 16 | 5–30 (10) |

TABLE 1-continued

| Sieve Size | Average RAP Material Percent Passing by Weight |
|---|---|
| No. 30 | 3–30 (7) |
| No. 50 | 0–15 (3) |
| No. 100 | 0–8 (1) |
| No. 200 | 0–8 (.5) |

One of ordinary skill in the art will be able to manipulate the percentages listed above to prepare suitable comminuted RAP material for use in the present invention. The reclaimed asphalt pavement utilized in the present invention includes all the asphalt pavement present between the top layer of the existing surface and the dirt subgrade of the surface.

The crushed and sized RAP can be stored or can be transferred for further processing.

An asphalt emulsion is necessarily added to the crushed and sized RAP in order to increase the amount of asphalt so that the resultant asphalt mixture possesses enough asphalt to bind all of the aggregate into a stable paving composition. The asphalt content must be adjusted so that the final asphalt content of the mixture ranges from about 4.0% to about 6.5%, preferably from about 5.25% to about 5.75%. All percentages are based on the total weight percent of the resulting asphalt paving composition. In order to determine how much asphalt binder should be added to the sized RAP, representative samples of sized RAP material are tested to determine the optimum moisture content, type and content of bituminous material, size and amount of aggregate and mix portions. Suitable testing procedures are displayed in the example herein. Based on the amount of asphalt and aggregate present in the sized RAP, additional asphalt is added in the form of an asphalt emulsion. Additional aggregate and/or filler may also be added. The added asphalt emulsion may be blended with the sized RAP in any conventional asphalt mixing apparatus to produce a cold mix asphalt paving composition containing from about 4.0% to about 6.5% asphalt, preferably from about 5.25% to about 5.75% asphalt. Accordingly, the amount of asphalt emulsion added to the sized RAP material will depend upon the percent of asphalt present in the sized RAP. Other factors that will either increase or decrease the amount of asphalt emulsion added to the sized RAP material include but are not limited to the geographic location for deposition of the pavement, the amount of added filler and the type of filler employed in the paving composition.

The asphalt emulsion primarily consists of at least 80% by weight of bitumen, however, the emulsion may additionally contain a polymer. If a polymer is present in the asphalt emulsion, it is preferably a rubber based polymer. Suitable rubber based polymers include but are not limited to poly isoprene, butyl rubber, polybutenes, polystyrene/butadiene rubber, ethylene/vinyl acetate copolymers and the like. Most preferably, the rubber based polymer is STYRELF rubber as disclosed in U.S. Pat. No. 4,145,322 which is herein incorporated by reference. The asphalt emulsion may contain up to 20% aromatics, preferably 0% aromatics in the asphalt emulsion, to reduce the amount of aromatic hydrocarbons evaporated into the air upon installation of the pavement.

The cold mix asphalt paving composition of the present invention may optionally include 0 to 40% of a filler. Examples of suitable fillers include ceramic particles, roofing shingles, crumb rubber from rubber tires, fly ash, slag, plastics and other conventional materials. Mixtures of the above listed fillers may also be utilized.

Additional virgin aggregate may be added to the crushed RAP in amounts ranging from 0 to 50% by weight. Suitable aggregates include but are not limited to crushed bricks, gravel, stone, glass and mixtures thereof. The aggregate preferably possesses no particles larger than 2 inches in diameter, a reasonably uniform gradation from course to fine. The virgin aggregate should be free of foreign materials such as dirt. Both the aggregate and the filler are preferably blended with the sized RAP prior to mixing with the added asphalt emulsion in any conventional asphalt mixing apparatus.

The asphalt paving composition may be used to coat roadway surfaces, parking lots, driveways, and the like. The composition may not be applied to a surface if the temperature of the surface is below 45 degrees Fahrenheit. Once the asphalt paving composition has been applied to a surface the cold mix asphalt pavement can be utilized as final paving compositions or can be sealed with a top coat after the cold mix asphalt has been layed and cured by allowing the moisture content of the cold mix asphalt to evaporate to 2% or less. The top coat will preferably be added in a layer approximately 1-1.5 inches deep. Any conventional hot mix or surface treatment top coat such as a surface chip treatment with a heated asphalt emulsion with a stone chip overlay may be used. Preferably the top coat will be a hot asphalt coating.

EXAMPLE

The process of the present invention is performed according to the flow diagram as displayed in FIG. 1. Asphalt pavement is removed by excavation from a parking lot and transported as asphalt rubble by dump truck to rubble stockpile 1. The asphalt rubble from stockpile 1 is loaded into a rubble separator 3, namely a Grissley vibrating screen having a separating screen consisting of a punch plate having 1.5" square holes. The separator 3 separates the asphalt rubble into waste products such as dirt removed via waste stream 5 and into clean or purified asphalt rubble removed from the separator 3 via conveyor 7. The purified asphalt rubble passes on conveyor 7 into comminuting device 9 consisting of an impact crusher which crushes the asphalt rubble into the sizes displayed in Table 1 to produce a sized asphalt aggregate mixture stockpile 11.

A sample is taken from the sized asphalt aggregate mixture and analyzed for asphalt content. The asphalt is determined by using the ASTM extraction procedure VTM-36 identified as the Virginia Test Method for Quantitative Extraction of Bitumen from Asphalt Paving Mixtures by the Reflux Method or any other accepted testing procedure known to those skilled in the art.

After testing, the sized asphalt is optionally blended with virgin aggregate supplied from hopper 13 and/or filler supplied from hopper 15 and the resultant mixture is then transferred into mixer 17 to which is added the appropriate amount of asphalt emulsion 19 to bring the total amount of asphalt in the resulting cold mix asphalt paving composition to between 4.0% and 6.5% percent by weight. The cold mix asphalt paving composition is then transferred to a storage tank 21 for subsequent dispensing to trucks for transporting the cold mix to paving site.

The foregoing description has been limited to specific embodiments of the invention. It will be apparent, however, that variations and modifications can be made to the invention, with the attainment of some or all of the advantages of the invention. Therefore it is the object of the appended claims to cover all such variations and modifications as come within the true spirit and scope of the invention.

What is claimed is:

1. A method of producing a cold mix asphalt paving composition from asphalt rubble, said method comprising the steps of:
   (a) separating non-asphalt impurities from an asphalt rubble obtained from a reclaimed asphalt pavement to produce a purified asphalt rubble;
   (b) comminuting said purified asphalt rubble to obtain sized asphalt-aggregate mixture;
   (c) determining the percent of asphalt present in said sized asphalt-aggregate mixture according to ASTM extraction procedures;
   (d) blending an asphalt emulsion with said sized asphalt-aggregate mixture in an amount so as to yield a cold mix asphalt pavement composition comprising from about 4.0% to about 6.5% by weight of asphalt.

2. The method according to claim 1 wherein said asphalt rubble comprises all the asphalt pavement present between the top layer and the dirt subgrade of an existing asphalt paved surface.

3. The method according to claim 1 wherein said asphalt emulsion comprises a mixture of bitumen and a rubbery polymer.

4. The method according to claim 3 wherein said rubbery polymer is a styrene/butadiene polymer.

5. The method according to claim 1 further comprising adding 0-40% by weight of a filler to said asphalt paving composition.

6. The method according to claim 5 wherein said filler is selected from the group consisting of ceramic particles, roofing shingles, crumb rubber recovered from rubber tires, and mixtures thereof.

7. The method according to claim 1 wherein said asphalt paving composition comprises at least about 80% by weight of reclaimed asphaltic pavement.

8. The method according to claim 1 wherein said separating step is conducted by a vibrating screen.

9. The method according to claim 1 wherein said comminuting step is performed by an impact crusher.

10. The method according to claim 1 wherein said asphalt emulsion is added to said sized asphalt-aggregate in an amount so as to yield an asphalt paving composition comprising from about 5.25% to about 5.75% by weight of asphalt.

11. The method according to claim 1 which further comprises applying the cold mix asphalt composition produced in step (e) to a surface to form a paved surface.

12. The method according to claim 11 which further comprises applying a hot mix asphalt top coat to said paved surface.

* * * * *